(12) United States Patent
Motoyoshi et al.

(10) Patent No.: US 10,173,325 B2
(45) Date of Patent: Jan. 8, 2019

(54) ROBOT, ROBOT CONTROL APPARATUS AND ROBOT SYSTEM

(71) Applicant: Seiko Epson Corporation, Tokyo (JP)

(72) Inventors: Masaki Motoyoshi, Azumino (JP); Norio Yokoshima, Hara (JP)

(73) Assignee: Seiko Epson Corporation (JP)

( * ) Notice: Subject to any disclaimer, the term of this patent is extended or adjusted under 35 U.S.C. 154(b) by 252 days.

(21) Appl. No.: 15/066,202

(22) Filed: Mar. 10, 2016

(65) Prior Publication Data

US 2016/0288332 A1 Oct. 6, 2016

(30) Foreign Application Priority Data

Mar. 30, 2015 (JP) ................................. 2015-068268

(51) Int. Cl.
*B25J 9/16* (2006.01)
*B25J 13/08* (2006.01)

(52) U.S. Cl.
CPC ........... *B25J 9/1697* (2013.01); *B25J 9/1692* (2013.01); *B25J 13/085* (2013.01); *G05B 2219/39024* (2013.01); *G05B 2219/39045* (2013.01)

(58) Field of Classification Search
CPC ...... B25J 9/1697; B25J 9/1692; B25J 9/1666; B25J 9/1633; B25J 13/085
See application file for complete search history.

(56) References Cited

U.S. PATENT DOCUMENTS

| | | | | |
|---|---|---|---|---|
| 6,304,050 | B1 * | 10/2001 | Skaar ..................... | B25J 9/1692 318/568.11 |
| 6,681,151 | B1 * | 1/2004 | Weinzimmer ......... | B25J 9/1697 219/121.85 |
| 7,437,214 | B2 | 10/2008 | Sabe et al. | |
| 9,393,687 | B2 * | 7/2016 | Hietmann .............. | B25J 9/0081 |
| 9,511,496 | B2 * | 12/2016 | Sarh ....................... | B25J 9/1697 |
| 2014/0277722 | A1 | 9/2014 | Nagai et al. | |
| 2015/0088311 | A1 * | 3/2015 | Suzuki ................... | B25J 9/1692 700/254 |
| 2015/0202015 | A1 * | 7/2015 | Elhawary ........... | A61B 19/2203 606/130 |

FOREIGN PATENT DOCUMENTS

| | | |
|---|---|---|
| JP | 05-301182 A | 11/1993 |
| JP | 07-325611 A | 12/1995 |
| JP | 2008-284690 A | 11/2008 |
| JP | 2012-040634 A | 3/2012 |
| JP | 2013-013987 A | 1/2013 |
| JP | 2013-111684 A | 6/2013 |
| JP | 2014-176943 A | 9/2014 |

* cited by examiner

*Primary Examiner* — Timothy R Waggoner
(74) *Attorney, Agent, or Firm* — Harness, Dickey & Pierce, P.L.C.

(57) ABSTRACT

A robot includes a force detector, and a drive part that changes a position relationship between a marker and an imaging part. In the case with calibration processing of specifying a coordinate relationship as a correspondence relationship between a reference coordinate system with reference to a position of the marker and a robot coordinate system as reference of control of the drive part based on images of the marker captured by the imaging part in a plurality of the position relationships, the drive part is controlled to have anisotropy based on the coordinate relationship and a detection value of the force detector.

15 Claims, 8 Drawing Sheets ic # ROBOT, ROBOT CONTROL APPARATUS AND ROBOT SYSTEM

BACKGROUND

1. Technical Field

The present invention relates to a robot, a robot control apparatus and a robot system.

2. Related Art

In related art, in control of a robot arm, a technology of facilitating a movement of the robot arm only in a direction in which a movement action is guided by increasing gain only in the direction in which the movement action of the robot arm is guided by an operator is known (see Patent Document 1 (JP-A-2013-111684)). Thereby, the operator may guide the robot arm to move in another direction than the direction of the guidance of the movement action.

However, there may be cases where a direction recognized by the operator in a real space or a direction in which work is moved within the real space is different from the direction in which the movement of the robot arm is facilitated by increase of the gain. For example, there is a problem that, though the robot arm should be moved in the horizontal direction, the robot arm is controlled so that the robot arm may be easily moved in a direction different from the horizontal direction.

SUMMARY

An advantage of some aspects of the invention is to provide a technology of giving anisotropy to an action of a robot in a direction in accordance with a real space.

(1) A robot according to an aspect of the invention includes a force detector, and a drive part that changes a position relationship between a marker and an imaging part, wherein, in the case with calibration processing of specifying a coordinate relationship as a correspondence relationship between a reference coordinate system with reference to a position of the marker and a robot coordinate system as reference of control of the drive part based on images of the marker captured by the imaging part in a plurality of the position relationships, the drive part is controlled to have anisotropy based on the coordinate relationship and a detection value of the force detector.

In the configuration, the coordinate relationship between the reference coordinate system and the robot coordinate system is specified in advance and the drive part is controlled to have anisotropy based on the coordinate relationship, and thereby, anisotropy may be provided to the action of the robot in a direction in accordance with the real space in which the marker exists. Here, to change the position relationship between the marker and the imaging part may be to fix the position and the attitude of the imaging part and change the position and the attitude of the marker by the drive part or to fix the position and the attitude of the marker and change the position and the attitude of the imaging part by the drive part.

The functions of the respective means described in the appended claims are realized by hardware resources having functions specified by the configurations themselves, hardware resources having functions specified by programs, or combinations of them. Further, the functions of the respective means are not limited to those realized by hardware resources respectively physically independent of each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be explained with reference to the accompanying drawings in the following order. The same signs are assigned to corresponding component elements in the respective drawings and the overlapping explanation will be omitted.

(1) First Embodiment:
(1-1) Regarding Control of Arm:
(1-1-1) With Calibration Processing:
(1-1-2) Without Calibration Processing:
(1-2) Regarding Teaching Processing:
(1-3) Regarding Calibration Processing:
(2) Other Embodiments:

(1) First Embodiment

Figure 1:
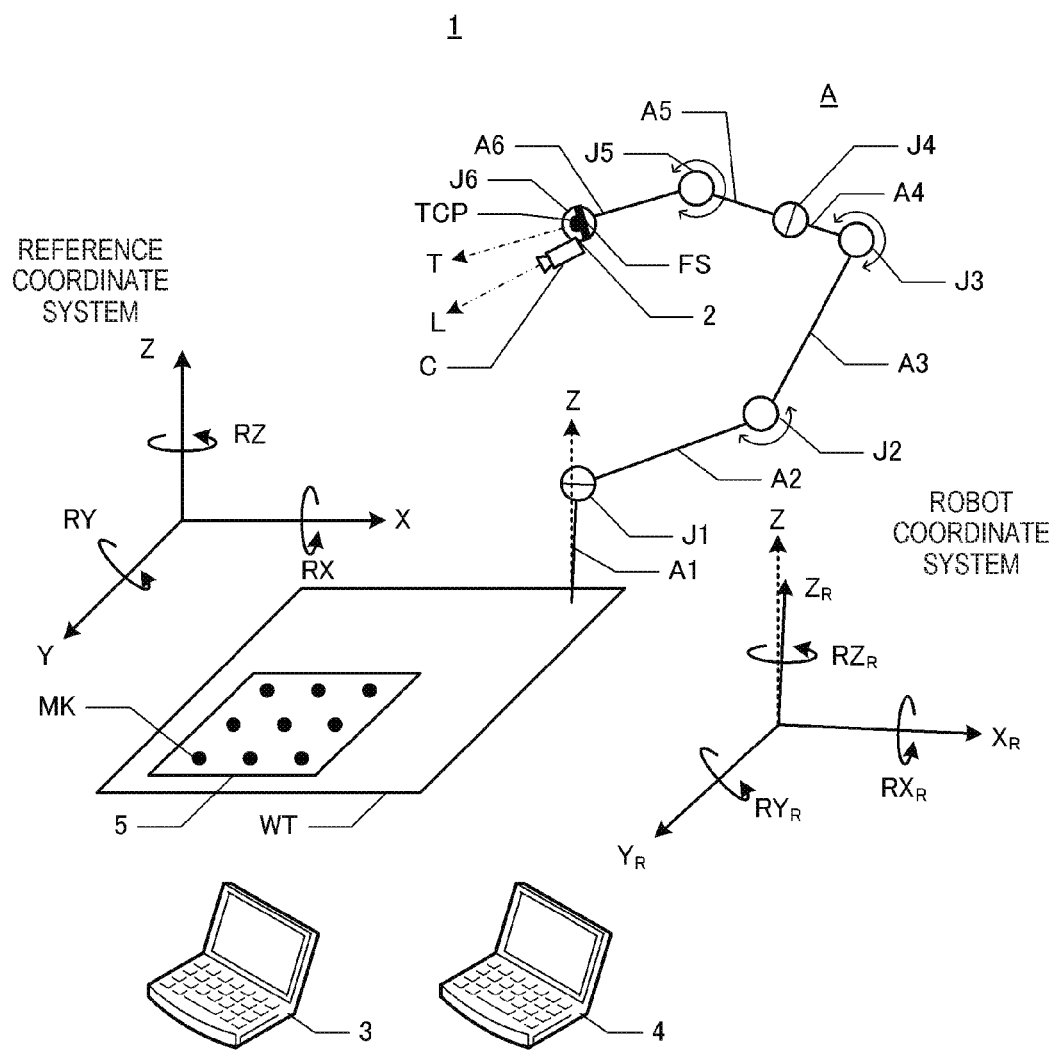
FIG. 1 is a schematic diagram of a robot system.

As shown in FIG. 1, a robot system as a first example of the invention includes a robot 1, an imaging unit 2, a teaching terminal 3 (teaching pendent), a control terminal 4 (controller). The teaching terminal 3 and the control terminal 4 form a robot control apparatus according to the invention. The control terminal 4 forms a control unit according to the invention. The teaching terminal 3 and the control terminal 4 may be respectively dedicated computers, or general-purpose computers in which programs for the robot 1 are installed. Or, the teaching terminal 3 and the control terminal 4 may be a single computer, not separate computers.

The robot 1 is a single-arm robot having one arm A, and the arm A has six joints J1, J2, J3, J4, J5, J6. The joints J1, J2, J3, J4, J5, J6 couple six arm members A1 to A6. The joints J2, J3, J5 are bending joints and the joints J1, J4, J6 are twisting joints. An end effector for grasping and processing of work is attached to the joint J6. The rotation shaft of the joint J6 on the distal end is referred to as "distal end rotation shaft T". A predetermined position on the distal end rotation shaft T on the distal end side of the joint J6 is referred to as "tool center point (TCP)" and the position of TCP serves as reference of positions of various end effectors. Further, a force sensor FS is provided in the joint J6. The force sensor FS is a six-axis force detector. The force sensor FS detects magnitudes of forces on three detection axes orthogonal to one another in a sensor coordinate system as a specific coordinate system and magnitudes of torque about the three detection axes. Suppose that the position relationship between the sensor coordinate system and the TCP is known.

In FIG. 1, the imaging unit 2 for calibration processing, which will be described later, is attached to the distal end of the joint J6 as the end effector. A coordinate system that defines the real space in which the robot 1 is installed is referred to as "reference coordinate system". The reference coordinate system is a three-dimensional orthogonal coordinate system defined by an X-axis and a Y-axis horizontally orthogonal to each other and a Z-axis with the upward vertical direction as a positive direction. Further, the rotation angle about the X-axis is referred to as RX, the rotation angle about the Y-axis is referred to as RY, and the rotation angle about the Z-axis is referred to as RZ. An arbitrary position in the three dimensional space may be expressed by the positions in the X, Y, Z directions, and an arbitrary attitude (rotation direction) in the three dimensional space may be expressed by the rotation angles in the RX, RY, RZ directions. As below, the expression "position" may also mean "attitude". Further, the expression "force" may also mean "torque acting in the RX, RY, RZ directions".

The control terminal 4 controls the position of the TPC in the reference coordinate system or a robot coordinate system. Here, the robot coordinate system is an orthogonal coordinate system dependent on the installation state of the robot 1 and ideally coincides with the reference coordinate system in the embodiment. That is, the directions of the axes defining the robot coordinate system ($X_R$, $Y_R$, $Z_R$, $RX_R$, $RY_R$, $RZ_R$) ideally coincide with the directions of the axes defining the reference coordinate system (X, Y, Z, RX, RY, RZ).

However, depending on the installation state of the robot 1, the robot coordinate system may differ from the reference coordinate system. For example, suppose that the robot coordinate system is defined so that the length direction of the arm member A1 on the most proximal side of the arm A may coincide with the $Z_R$ direction of the robot coordinate system. In this case, if the robot 1 is installed with the length direction of the arm member A1 in the vertical (Z-axis) direction, the $Z_R$ direction of the robot coordinate system coincides with the Z direction of the reference coordinate system, however, as shown in FIG. 1, if the length direction of the arm member A1 is not aligned with the vertical direction, the $Z_R$ direction of the robot coordinate system does not coincide with the Z direction of the reference coordinate system. In this case, for example, even when an instruction is given to the robot 1 to move work in the $Z_R$ direction of the robot coordinate system, the work actually moves in a direction different from the vertical direction. Further, the robot coordinate system and the reference coordinate system may differ due to aging degradation of the members forming the arm A or the like. In the embodiment, the robot 1 handles the work on a worktable WT forming a horizontal plane in the real space.

The imaging unit 2 includes a camera C as an imaging part. The imaging unit 2 may be an end effector having a mechanism of grasping and processing the work in addition to the camera C. The camera C is an area image sensor having a predetermined angle of view around an optical axis L at the center. On the basis of an image captured by the camera C (hereinafter, referred to as "calibration image"), a three-dimensional position relationship between a subject on the calibration image and the camera C may be specified. The imaging unit 2 may include a stereo camera as the camera C or a range sensor.

Figure 2:
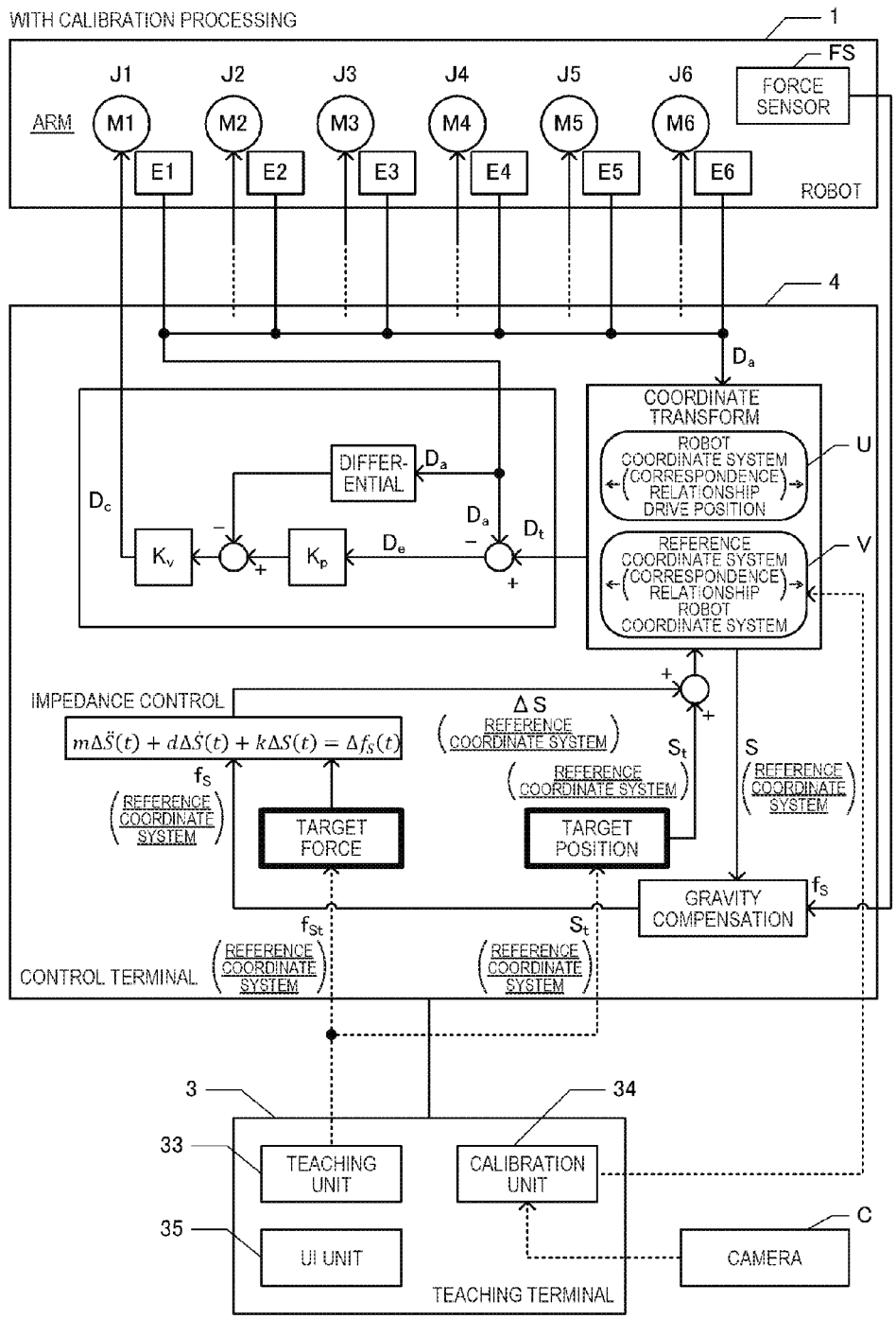
FIG. 2 is a block diagram of the robot system.

(1-1) Regarding Control of Arm:
(1-1-1) With Calibration Processing:

FIG. 2 is a block diagram of the robot system. The control terminal 4 controls the arm A so that a target position and a target force set in the teaching terminal 3 in advance may be realized at the TCP. In the case with the calibration processing, the target position and the target force are set in the reference coordinate system. Here, the target force is a force that should be detected by the force sensor FS. Here, the control of the arm A that realizes both the target position and the target force is referred to as "force control". In the case with the calibration processing, the character S expresses one direction of the directions of the axes defining the reference coordinate system (X, Y, Z, RX, RY, RZ). For example, if S=X, the X-direction component of the target position set in the reference coordinate system is referred to as $Z_t = X_t$, and the X-direction component of the target force is referred to as $f_{St} = f_{Xt}$. Further, S also refers to a position in the S direction.

The robot 1 includes motors M1 to M6 and encoders E1 to E6 as drive parts in addition to the configuration shown in FIG. 1. The control of the arm A means control of the motors M1 to M6. The motors M1 to M6 and the encoders E1 to E6 are provided in correspondence with the respective joints J1 to J6, and the encoders E1 to E6 detect drive positions of the motors M1 to M6. The control terminal 4 is communicable with the robot 1 and the teaching terminal 3. The control terminal 4 records a transform relationship U as a correspondence relationship between a combination of the drive positions of the motors M1 to M6 and the position of the TCP in the robot coordinate system. Further, the control terminal 4 records a target position $S_t$ and a target force $f_{St}$ with respect to each step of work performed by the robot 1. The target position $S_t$ and the target force $f_{St}$ are set in the teaching processing, which will be described later.

When acquiring the drive positions of the motors M1 to M6, the control terminal 4 transforms the drive positions into real position ($X_R$, $Y_R$, $Z_R$, $RX_R$, $RY_R$, $RZ_R$) of the TCP in the robot coordinate system using the transform relationship U. Further, the control terminal 4 transforms the real position of the TCP in the robot coordinate system into the real position S (X, Y, Z, RX, RY, RZ) of the TCP in the reference coordinate system using a coordinate relationship V.

The coordinate relationship V is a table or function representing the correspondence relationship between the robot coordinate system and the reference coordinate system, the correspondence relationship specified by calibration processing, which will be described later. Therefore, the real position S of the TCP in the reference coordinate system may be obtained only if the calibration processing is performed. The case where the calibration processing is performed means the case where the coordinate relationship V is recorded in the control terminal 4, and may be the case where an effective coordinate relationship V is recorded in the control terminal 4. The effective coordinate relationship V may be e.g. a coordinate relationship V created by calibration processing within a predetermined period from the present, a coordinate relationship V created by calibration processing after the last part replacement of the robot, or a coordinate relationship V created by calibration processing after the installation location of the robot 1 is last moved.

The control terminal 4 specifies a real force f acting on the force sensor FS in the reference coordinate system based on the real position S of the TCP in the reference coordinate system and the detection value of the force sensor FS. Note that the force sensor FS detects the detection value in a unique coordinate system, however, the relative position relationship between the sensor coordinate system (the directions of the three detection axes) and the TCP is recorded as known data, and thus, the control terminal 4 may specify the real force f in the robot coordinate system. Further, the control terminal 4 may specify the real force f in the reference coordinate system based on the coordinate relationship V. The control terminal 4 may perform gravity compensation on the real force f. The gravity compensation is to remove a gravity component from the real force f. The real force f after gravity compensation in the reference coordinate system may be regarded as another force than the gravity acting on the work.

The control terminal 4 substitutes the target force $f_{St}$ set by the teaching processing to be described later and the real force f in an equation of motion of impedance control, and thereby, specifies a force-derived correction amount ΔS. Equation (1) is the equation of motion of impedance control. When the teaching processing is performed, the target force $f_{St}$ and the real force f are defined in the reference coordinate system, and the impedance control is performed in the reference coordinate system.

$$m\Delta\ddot{S}(t)+d\Delta\dot{S}(t)+k\Delta S(t)=\Delta f_S(t) \quad (1)$$

The left side of the equation (1) is formed by the first term of multiplication of a second differential value of the real position S of the TCP by an inertia coordinate m, the second term of multiplication of a differential value of the real position S of the TCP by a viscosity coefficient d, and the third term of multiplication of the real position S of the TCP by an elastic coefficient k. The right side of the equation (1) is formed by a force deviation $\Delta f_S(t)$ obtained by subtraction of the real force f from the target force $f_{St}$ of the TCP. The differential in the equation (1) means differential by time. At the step performed by the robot 1, a constant value may be set as the target force $f_{St}$ or a value derived by a function dependent on the time is set as the target force $f_{St}$.

The impedance control is control of realizing a virtual mechanical impedance by the motors M1 to M6. The inertia coefficient m means a mass that the TCP virtually has, the viscosity coefficient d means a viscosity resistance to which the TCP is virtually subjected, and the elastic coefficient k is a spring constant to which the TCP is virtually subjected. The respective coefficients m, d, k may be set to different values with respect to each direction or set to common values regardless of the directions. The force-derived correction amount ΔS means the magnitude of the position S to which the TCP should move when the TCP is subjected to the mechanical impedance in order to dissolve the force deviation $\Delta f_S(t)$ from the target force $f_{St}$. The control terminal 4 adds the force-derived correction amount ΔS to the target position $S_t$ in the reference coordinate system set by the teaching processing to be described later, and thereby, specifies a corrected target position ($S_t$+ΔS) in consideration of the impedance control.

Then, the control terminal 4 transforms the corrected target positions ($S_t$+ΔS) in the respective directions in the reference coordinate system into corrected target positions ($S_t$+ΔS) in the respective directions in the robot coordinate system based on the coordinate relationship V. Further, the control terminal 4 transforms the corrected target positions ($S_t$+ΔS) in the robot coordinate system into target drive positions $D_t$ as target drive positions of the respective motors M1 to M6 based on the correspondence relationship U. Then, the control terminal 4 subtracts the real drive positions $D_a$ of the motors M1 to M6 from the target drive positions $D_t$, and thereby, drive position deviations $D_e$ ($=D_t-D_a$) are calculated. Then, the control terminal 4 specifies control amounts $D_c$ by adding values obtained by multiplication of the drive position deviations $D_e$ by position control gain $K_p$ and values obtained by multiplication of drive velocity deviations as differences from drive velocities as time differential values of the real drive positions $D_a$ by velocity control gain $K_v$. Note that the position control gain $K_p$ and the velocity control gain $K_v$ may contain control gain not only on the proportional component but on the differential component and the integral component. The control amount $D_c$ is specified with respect to each of the motors M1 to M6.

According to the above described configuration, in the case with the calibration processing, the control terminal 4 may control the arm A based on the target position $S_t$ and the target force $f_{St}$ in the reference coordinate system. That is, in the case with the calibration processing, the impedance control is performed with reference to the directions of the axes defining the reference coordinate system (X, Y, Z, RX, RY, RZ). Therefore, the mechanical impedance characteristics (elasticity, viscosity, inertia) realized by the impedance control also mean characteristics in the directions of the axes defining the reference coordinate system.

Figure 3:
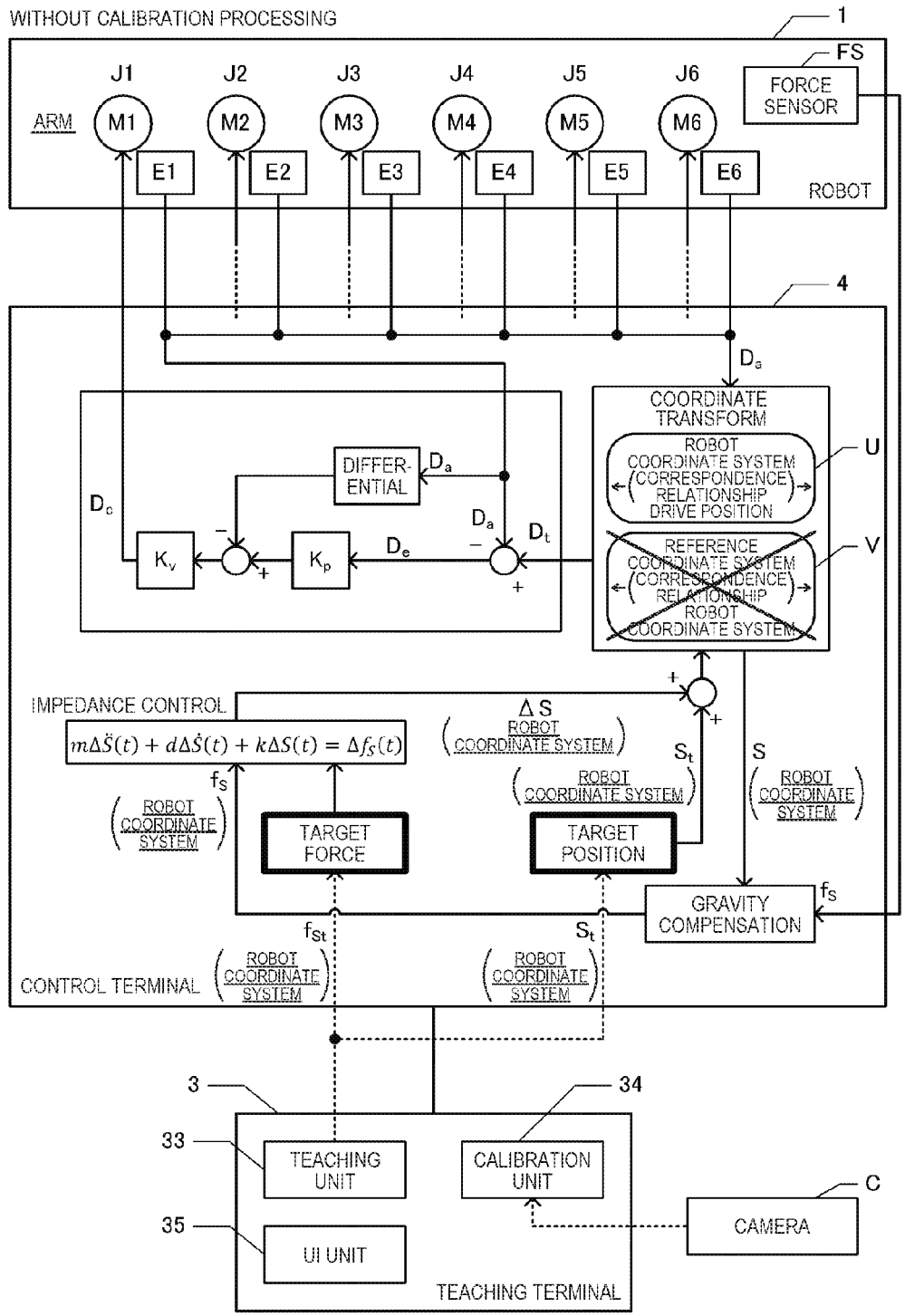
FIG. 3 is a block diagram of the robot system.

(1-1-2) Without Calibration Processing:

FIG. 3 is a block diagram of the robot system. In FIG. 3, the robot system without calibration processing is shown and the coordinate relationship V is not recorded in the control terminal 4. In the case without the calibration processing, suppose that the target position $S_t$ and the target force $f_{St}$ are set in the robot coordinate system. In the case without the calibration processing, the character S expresses one direction of the directions of the axes defining the robot coordinate system ($X_R$, $Y_R$, $Z_R$, $RX_R$, $RY_R$, $RZ_R$). For example, if $S=X_R$, the $X_R$-direction component of the target position set in the robot coordinate system is referred to as $S_t=X_{Rt}$, and the X-direction component of the target force is referred to as $f_{St}=f_{XRt}$.

In this case, the control terminal 4 does not transform the real position S of the TCP in the robot coordinate system into the real position S of the TCP in the reference coordinate system using the transform relationship V, but performs force control based on the real position S of the TCP in the robot coordinate system. In the case without the calibration processing, the target force $f_{St}$ and the real force f are defined in the robot coordinate system, and thus, impedance control is performed in the robot coordinate system. That is, in the case without the calibration processing, the impedance control with reference to the directions of the axes defining the robot coordinate system ($X_R$, $Y_R$, $Z_R$, $RX_R$, $RY_R$, $RZ_R$). Therefore, the mechanical impedance characteristics (elasticity, viscosity, inertia) realized by the impedance control also mean characteristics in the directions of the axes defining the robot coordinate system.

(1-2) Regarding Teaching Processing:

A teaching program for various settings of the robot 1 is installed in the teaching terminal 3. The teaching terminal 3 includes a processer, a RAM, and a ROM, and these hardware resources cooperatively operate with the teaching program. Thereby, as shown in FIGS. 2 and 3, the teaching terminal 3 includes a teaching unit 33, a calibration unit 34, an a UI (User Interface) unit 35 as functional configurations. Though not illustrated, the teaching terminal 3 includes an input device (mouse, keyboard, touch panel, or the like) that receives commands from a user and an output device (display, speaker, or the like) that outputs various kinds of information to the user. As below, the respective functional configurations will be explained according to the order of the flowchart. The UI unit 35 forms a user interface unit according to the invention.

Figure 4:
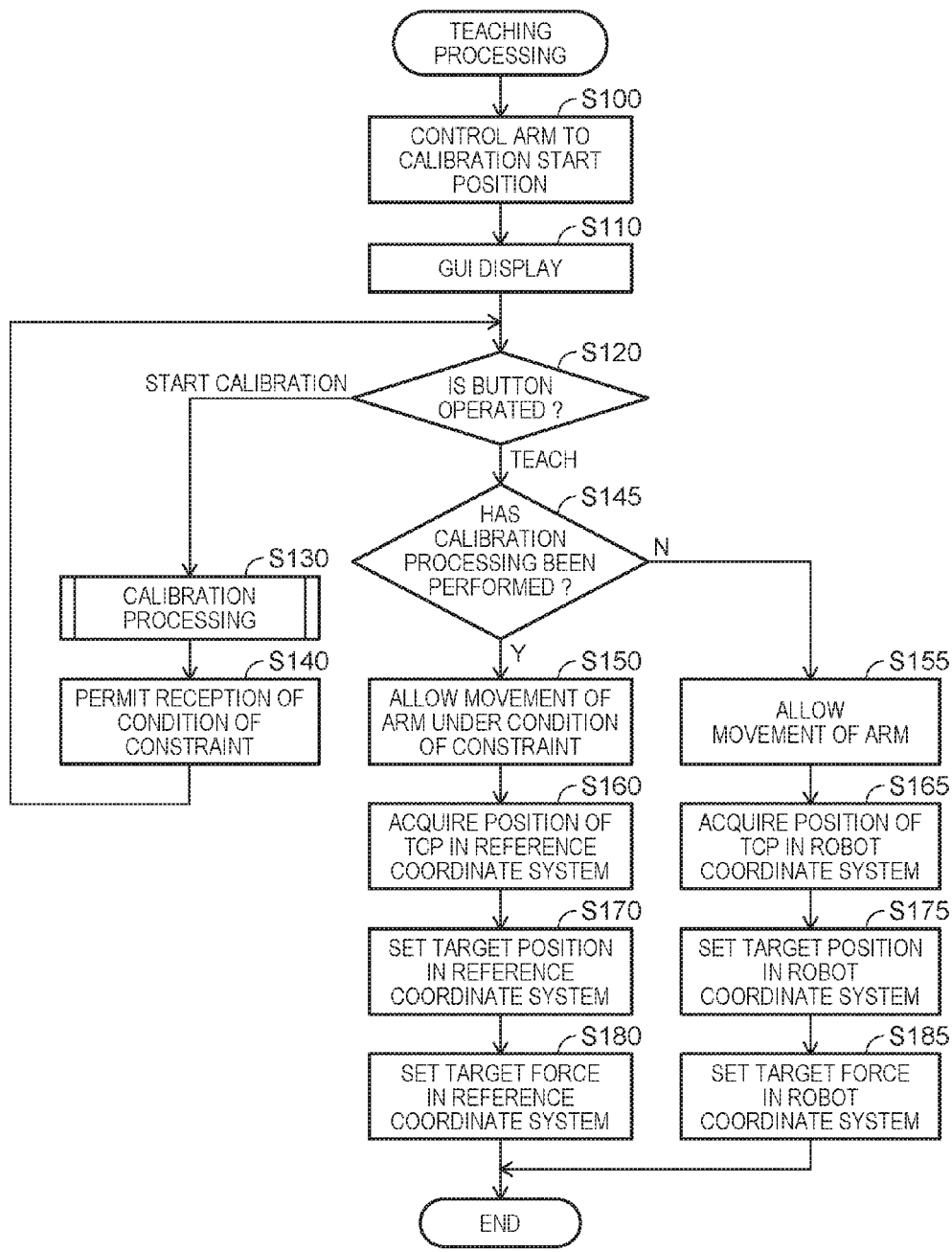
FIG. 4 is a flowchart of teaching processing.

FIG. 4 is a flowchart of the teaching processing. First, the calibration unit 34 controls the arm A to a calibration start position (step S100). The control of the arm A to the calibration start position means control of the arm A so that the TCP may be in a predetermined calibration start position. The calibration start position may be any position, e.g. a center position within a space in which the TCP is movable.

Then, the UI unit 35 displays a GUI (Graphic User Interface) (step S110). That is, the UI unit 35 outputs image data representing the GUI to the display, and thereby, displays the GUI on the display. Then, the UI unit 35 monitors the operation of an operator for the input device, and thereby, receives a calibration start command in the GUI.

Figure 5:
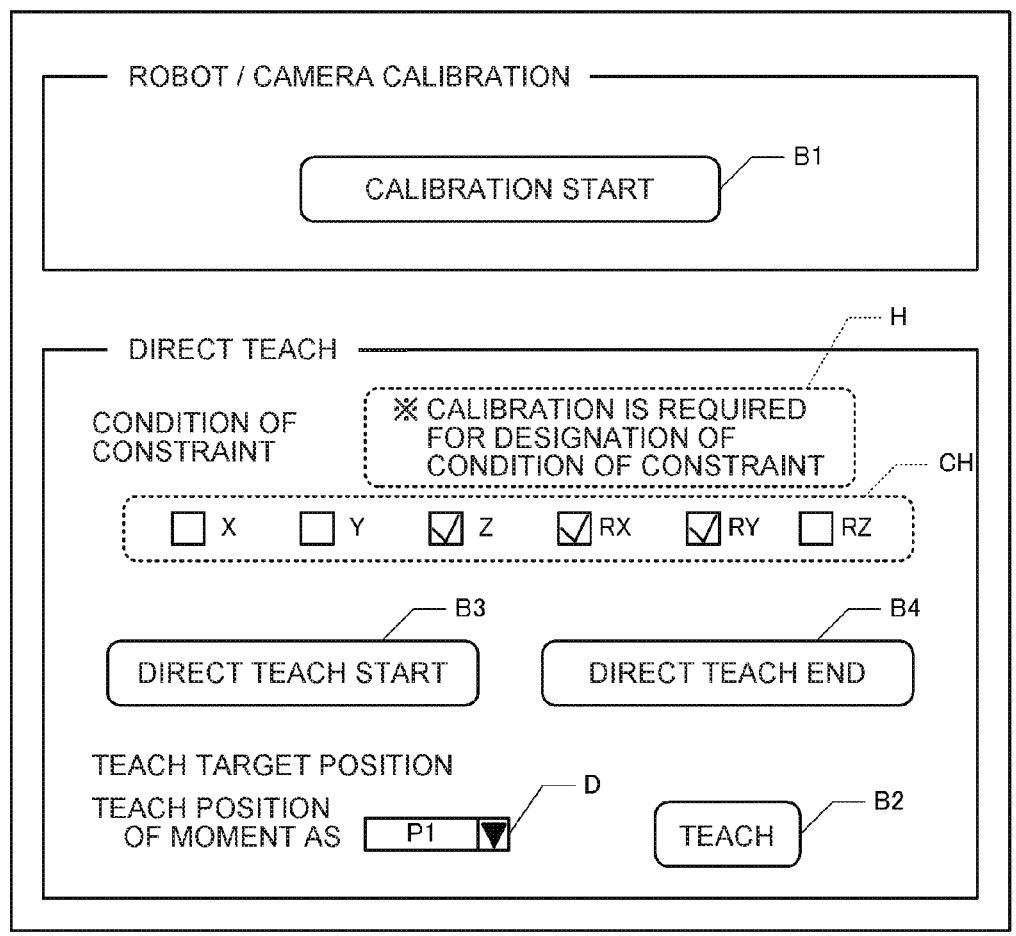
FIG. 5 shows a GUI.

FIG. 5 shows an example of the GUI. In the GUI, a calibration start command button B1 with words "START CALIBRATION" and a teach command button B2 with a word "TEACHING" are provided. Further, in the GUI, checkboxes CH for designating whether or not to constrain the TCP with respect to the respective directions (X, Y, Z, RX, RY, RZ) in the reference coordinate system, a dropdown list D for designating the name of the position for teaching, and a message part H showing a notification "calibration is required for designation of condition of constraint" are provided.

When the GUI is displayed, the UI unit 35 determines whether the button operation in the GUI is the calibration start command or a teach command (step S120). That is, the UI unit 35 determines whether the calibration start command button B1 or a direct teach start button B3. If the calibration start command button B1 is operated, the calibration unit 34 executes calibration processing, which will be described later (step S130). If the calibration processing is performed, the coordinate relationship V defining the correspondence relationship between the reference coordinate system and the robot coordinate system is recorded in the control terminal 4, and thereby, the control terminal 4 can perform force control in the robot coordinate system. Then, the calibration processing is ended, the UI unit 35 permits reception of the condition of constraint (step S140). The permission of reception of the condition of constraint means permission of an operation of checking the check boxes CH. The UI unit 35 prevents checking of the check boxes CH by grayout or the like unless the calibration processing is performed.

On the other hand, if the direct teach start button B3 is operated at step S120, the teaching unit 33 determines whether or not the calibration processing has been performed (step S145). That is, the teaching unit 33 determines whether or not the control terminal 4 can perform force control in the reference coordinate system. If determining that the calibration processing has been performed (step S145: Y), the teaching unit 33 allows a movement of the arm A under a constraint state (step S150). The allowance of the movement of the arm A at step S150 means a movement of the arm A according to the operator holding the distal end of the arm A and moving the distal end.

Specifically, the teaching unit 33 commands the control terminal 4 to perform the following force control. In the embodiment, the control terminal 4 sets the elastic coefficient k of the equation (1) of the impedance control to zero, and keeps giving a fixed position as the target position $S_t$ of the TCP. That is, the elastic coefficient k is set to zero, and thereby, the movement of the arm is allowed only in the force-derived correction amount $\Delta S$ while the impedance control is performed under the condition that does not generate an elastic force proportional to the amount of change of the position S (a force to stay in the original position).

Further, if the movement of the arm A is allowed at step S150, the control terminal 4 sets the target force $f_{St}$ to zero in all directions. Thereby, with respect to the direction of the force $f_S$ acting on the distal end of the arm A by the operator, the force-derived correction amount $\Delta S$ in response to the force $f_S$ is derived from the equation (1), and the control amounts $D_c$ of the motors M1 to M6 are derived from the drive position deviations $D_e$ equal to the force-derived correction amount $\Delta S$. As a result, the arm A may be moved according to the movement of the distal end of the arm A by the operator. Note that, in the equation (1), the mechanical impedance is added. The larger the coefficients m, d, k of the equation (1), the smaller the magnitude of the force-derived correction amount $\Delta S$ derived from the force $f_S$. That is, the larger the coefficients m, d, k of the equation (1), the harder the movement of the arm A according to the movement of the distal end of the arm A by the operator. Further, the calibration processing has been performed, and thereby, at step S150, as shown in FIG. 2, the control terminal 4 may perform force control of the arm A at step S150 in the reference coordinate system.

Next, the constraint state at step S150 will be explained. The control terminal 4 performs control of the arm A to realize the constraint state only if the calibration processing has been performed. The constraint state is a state in which the arm A is controlled to have anisotropy in the reference coordinate system.

Specifically, the control terminal 4 performs control of the joints J1 to J6 based on the coordinate relationship V so that ease of movement of the TCP as a moving point movable by the arm A as a drive part may be larger in a second direction in the reference coordinate system than that in a first direction in the reference coordinate system. More specifically, the control terminal 4 performs control of the joints J1 to J6 so that the mechanical impedance realized by the joints J1 to J6 may be larger in the second direction in the reference coordinate system than that in the first direction in the reference coordinate system. That is, the control terminal 4 makes the ease of movement of the TCP in the reference coordinate system larger in the second direction than that in the first direction by adjustment of the mechanical impedance of the arm A.

As shown in FIG. 2, in the case with the calibration processing is performed, force control using the force-derived correction amount $\Delta S$ that satisfies the equation (1) with respect to the respective axes defining the reference coordinate system is performed, and the control terminal 4 sets the viscosity coefficient d in the first direction larger than the viscosity coefficient d in the second direction. That is, the viscosity resistance to which the TCP is subjected in the first direction is set to be larger than the resistance to which the TCP is subjected in the second direction. In comparison between the force-derived correction amounts $\Delta S$ derived from the force $f_S$ applied to the distal end of the arm A by the operator using the equation (1), the force-derived correction amount $\Delta S$ in the first direction is smaller than the force-derived correction amount $\Delta S$ in the second direction. Accordingly, the arm A is harder to move according to the movement of the distal end of the arm A by the operator in the first direction than in the second direction. Therefore, the viscosity coefficient d in the first direction is increased, and thereby, the movement of the TCP may be substantially limited in the first direction. In place of the viscosity coefficient d, or with the viscosity coefficient d, the magnitude of at least one of the other coefficients m, k of the equation (1) may be made different in the first direction and the second direction. Obviously, the elastic coefficient k is not necessarily zero. Further, the control terminal 4 disables the impedance control of the equation (1) in the first direction (regards the force-derived correction amount $\Delta S$ as zero) and regards the detection value of the force sensor FS as zero with respect to the first direction, and thereby, may not substantially allow the movement of the TCP in the first direction. Furthermore, the control terminal 4 may make the upper limit of the velocity and the acceleration at which the TCP can move different in the first direction and the second direction.

Here, the first direction is a direction of the reference coordinate system for which the checkbox CH is checked and the second direction is a direction of the reference coordinate system for which the checkbox CH is unchecked. If the direct teach start button B3 is operated in the state in which the calibration processing is performed and the checkbox CH is unchecked, all directions in the reference coordinate system are the second directions and, at step S150, the TCP is uniformly and easily moved according to the hand of the operator in all directions. That is, if the calibration processing is performed and none of the directions of the checkboxes CH is checked, the control of the arm A to have anisotropy in the reference coordinate system is substantially not performed, and the ease of movement of the arm A according to the movement of the distal end of the arm A by the operator is uniform in all directions.

In the example of FIG. 5, a condition of constraint that makes a movement of the TCP easier in the X direction and the Y direction as the second directions than that in the Z direction as the first direction is designated. Here, the X direction and the Y direction are two directions orthogonal to the Z direction on a single plane. Thereby, the teaching work for moving the TCP (work) on the horizontal plane orthogonal to the Z direction may be easily performed without changing the position in the Z direction. Further, in the example of FIG. 5, a condition of constraint that makes a movement (rotation) of the TCP easier in the RZ direction as the second direction than those in the RX direction and the RY direction as the first directions is designated. Thereby, the teaching work for rotating the TCP in the RZ direction may be easily performed without rotating the TCP in the RX direction and the RY direction. For example, the teaching work for turning a screw by an end effector or the like may be easily performed.

Or, the second direction may be a direction along a single axis in the reference coordinate system and the first directions may be two directions on a plane orthogonal to the single axis in the reference coordinate system. For example, a condition of constraint that makes a movement of the TCP easier in the Z direction as the second direction than those in the X direction and the Y direction as the first directions may be designated. Thereby, the teaching work for moving the TCP on a straight line may be easily performed. As described above, if the calibration processing is performed in advance, the constraint state may be accurately realized in the reference coordinate system, and the operator may easily move the TCP to a desired position. That is, the operator may teach the position of the TCP in a state in which the positions in the vertical direction and the horizontal direction (the direction in parallel to the worktable WT) are strictly constrained.

Here, the UI unit 35 receives designation as to whether or not the arm A is controlled to have anisotropy in the reference coordinate system in the check boxes CH in the teaching work (step S150). Then, if the calibration processing has been performed, the UI unit 35 permits designation as to control of the arm A to have anisotropy in the reference coordinate system in the check boxes CH in the teaching work. The UI unit 35 informs the operator of the requirement of the calibration processing by the message part H for control of the arm A to have anisotropy in the reference coordinate system in the teaching work (step S150).

At step S150, the operator moves the arm A to move the TCP to a desired position and operates a direct teach end button B4, and thereby, the force control is ended. Then, if the teach command button B2 is operated, the teaching unit 33 acquires the position of the TCP in the reference coordinate system (step S160). That is, the teaching unit 33 acquires the position of the TCP of the moment as the desired position for the operator from the robot 1. The control terminal 4 transforms the drive positions of the motors M1 to M6 into the real position of the TCP in the robot coordinate system using the transform relationship U, further transforms the real position of the TCP in the robot coordinate system into the real position S of the TCP in the reference coordinate system using the coordinate relationship V, and passes it to the teaching unit 33.

Then, the teaching unit 33 sets the target position $S_t$ of the TCP in the reference coordinate system (step S170). That is, the teaching unit 33 sets the real position of the TCP in the reference coordinate system acquired at step S160 as the target position $S_t$ corresponding to the name selected in the dropdown list D (P1 in FIG. 5) when the teach command button B2 is operated in the control terminal 4 of the teaching terminal 3.

Then, the teaching unit 33 sets the target force $f_{St}$ of the TCP in the reference coordinate system (step S180). That is, the teaching unit 33 sets e.g. a force in a magnitude and a direction designated by the operator on the GUI as the target force $f_{St}$ in the target position $S_t$ corresponding to the name selected in the dropdown list D when the teach command button B2 is operated. In the case without the force control, the processing at step S180 may be omitted. Note that the name is changed in the dropdown list D and the processing at steps S150 to S180 is repeatedly performed, and thereby, a plurality of the target positions $S_t$ can be set.

On the other hand, if not determining that the calibration processing has been performed (step S145: N), the teaching unit 33 allows a movement of the arm A (step S155). That is, the teaching unit 33 moves the arm A according to the movement of the distal end of the arm A by the operator without realizing the constraint state. In the case without the calibration processing, the coordinate system transform using the coordinate relationship is impossible, and, as shown in FIG. 3, the control terminal 4 may perform the force control of the arm A in the robot coordinate system. That is, like step S150, the control terminal 4 does not control the arm A so that the TCP may be the target position $S_t$, but performs impedance control with the target force $f_{St}$ as zero. In the impedance control at step S155, the coefficients k, d, m are set to the same values in all directions in the robot coordinate system. Thereby, the movement of the arm A by the operator may be uniformly allowed in all directions.

In the case without the calibration processing, substantially, the control of the arm A to have anisotropy is inhibited and the ease of movement of the arm A according to the movement of the distal end of the arm A by the operator is uniform in all directions. In the case without the calibration processing, the coordinate relationship V is not recorded in the control terminal 4, and it is impossible to control the arm A to have anisotropy in the reference coordinate system in the first place. That is, to control the arm A to have anisotropy without the calibration processing is to control the arm A to have anisotropy in the robot coordinate system, not in the reference coordinate system, however, the control of the arm A to have anisotropy in the robot coordinate system is inhibited.

The processing at steps S165, S175, S185 is nearly the same as the processing at steps S160, S170, S180. Note that, in the processing at steps S165, S175, S185, the calibration processing is not performed and it is impossible for the control terminal 4 to use the coordinate relationship V, and accordingly, the target position $S_t$ and the target force $f_{St}$ are set in the robot coordinate system. In this manner, without the calibration processing, the operator may freely move the arm A, move the TCP to a desired position, and perform the teaching work.

Figure 6A:
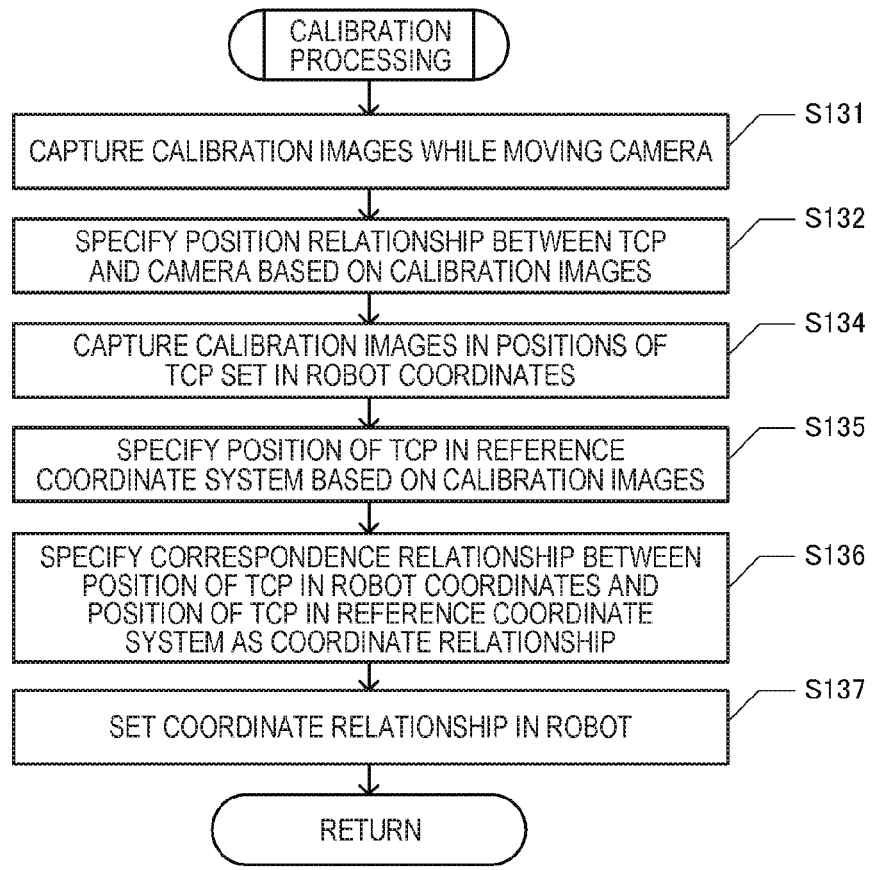
FIG. 6A is a flowchart of calibration processing.

(1-3) Regarding Calibration Processing:

FIG. 6A is a flowchart of the calibration processing. As described above, the calibration processing is processing of specifying the correspondence relationship between the reference coordinate system and the robot coordinate system and creating the correspondence relationship as the coordinate relationship V. Further, the calibration processing is processing executed by the calibration unit 34 of the teaching terminal 3. As shown in FIG. 1, the calibration processing is performed in a state in which a calibration board 5 is mounted on the worktable WT. A plurality of makers MK are provided on the calibration board 5. The calibration board 5 is placed on the horizontal worktable WT, and the markers MK are placed on the horizontal plane. The markers MK are arranged on grid points of an orthogonal grid, and a direction in which the markers MK are arranged in the lateral direction forms the X direction of the reference coordinate system and a direction in which the markers MK are arranged in the longitudinal direction forms the Y direction of the reference coordinate system in FIG. 1. Further, the vertical direction orthogonal to the horizontal plane with the markers MK placed thereon forms the Z direction of the reference coordinate system. As described above, the directions of the axes defining the reference coordinate system are set with reference to the positions of the markers MK. Obviously, the positions of the markers MK in the reference coordinate system are known.

First, the calibration unit 34 captures a plurality of calibration images while moving the camera C (step S131). Then, the calibration unit 34 specifies the position relationship between the TCP and the camera C based on the position of the TCP in the robot coordinate system and the calibration images (step S132). Note that the optical specifications of the camera C are recorded in the teaching terminal 3 as known information. The calibration unit 34 specifies the reference position of the camera C (e.g. the position in which the optical axis L and the lens surface cross) in the reference coordinate system with respect to each captured image based on the positions of the markers MK known in the reference coordinate system, the positions of the images of the markers MK in the captured image, the focal length when the captured image is captured, and the optical specifications of the camera C.

Figure 6B:
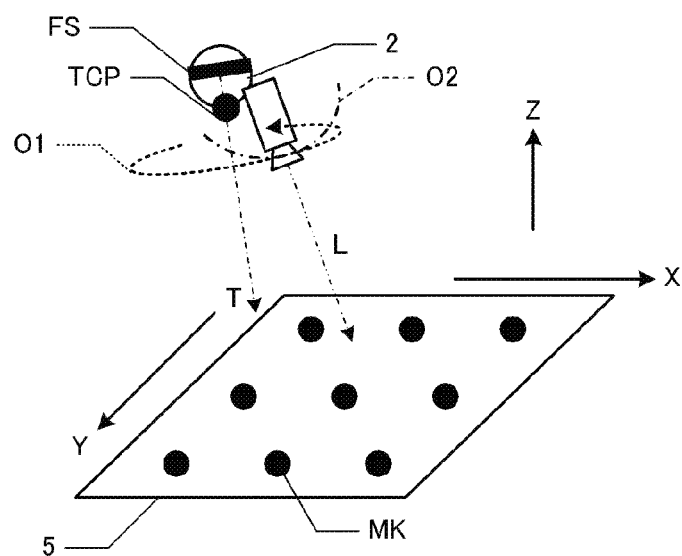
FIG. 6B is a schematic diagram of the calibration processing.

FIG. 6B is a schematic diagram for explanation of a movement of the camera C at step S131. For example, at step S131, when a plurality of captured images are captured while only the joint J6 on the distal end is rotated and the imaging unit 2 is rotated about the distal end rotation axis T, an orbit O1 of the reference position of the camera C forms a contour of the section of a cone around the distal end rotation axis T as a center axis. Therefore, the calibration unit 34 specifies the center axis of the cone, and thereby, may specify the position and the direction of the distal end rotation axis T in the reference coordinate system. Further, at step S131, when a plurality of captured images are captured while the position of the TCP (not including its attitude) is fixed and the TCP is rotated about the orthogonal axis to the distal end rotation axis T, the position of a center angle of an arc formed by an orbit O2 of the reference position of the camera C and the TCP exist on a single plane orthogonal to the distal end rotation axis T. Therefore, the calibration unit 34 specifies the orthogonal plane of the calibration unit 34 in which the center angle is located, and thereby, may specify the position of the TCP on the distal end rotation axis T in the reference coordinate system. In the reference coordinate system, if the position of the TCP and the reference position of the camera C may be specified, the calibration unit 34 may specify the correspondence relationship between the position of the TCP and the reference position of the camera C. Note that the position relationship between the TCP and the camera C is not necessarily unknown, but the position relationship between the TCP and the camera C may be known. In this case, the steps S131, S132 may be omitted.

Then, the calibration unit 34 captures calibration images in a plurality of positions of the TCP set in the robot coordinate system (step S134). That is, the robot 1 controls the arm A to be in the plurality of positions of the TCP set in the robot coordinate system, and the calibration unit 34 acquires the calibration images captured by the camera C in the respective positions of the TCP. The plurality of positions of the TCP set at step S134 may be e.g. positions on grid points that uniformly distribute in the robot coordinate system.

Then, the calibration unit 34 specifies the position of the TCP in the reference coordinate system based on the calibration images (step S135). That is, the calibration unit 34 specifies the reference position of the camera C in the reference coordinate system based on the positions of the markers MK known in the reference coordinate system, the positions of the images of the markers MK in the captured images, the focal lengths when the captured images are captured, and the optical specifications of the camera C, and further specifies the position of the TCP in the reference coordinate system based on the position relationship between the TCP and the reference position of the camera C specified at step S132.

Then, the calibration unit 34 specifies the correspondence relationship between the position of the TCP in the robot coordinate system and the position of the TCP in the reference coordinate system as the coordinate relationship V (step S136). That is, the calibration unit 34 acquires a plurality of the corresponding relationships between the position of the TCP in the robot coordinate system moved when the captured images are captured at step S134 and the position of the TCP in the reference coordinate system obtained based on the captured images, and specifies the coordinate relationship V showing the plurality of correspondence relationships. The coordinate relationship V may be a table that defines a plurality of correspondence relationships (coordinates) between the positions of the TCP in the robot coordinate system and the positions of the TCP in the reference coordinate system or a function that can transform the positions of the TCP in the robot coordinate system and the positions of the TCP in the reference coordinate system into each other. When the coordinate relationship V is a table defining the pluralities of coordinates, the control terminal 4 may transform the positions of the TCP in the robot coordinate system and the positions of the TCP in the reference coordinate system into each other by interpolation calculation. When the coordinate relationship V is a function, the function may be a linear function (rotation matrix) or nonlinear function. Finally, the calibration unit 34 sets the coordinate relationship V in the robot 1 (step S137).

Thereby, the coordinate relationship V is recorded in the control terminal 4, so that the control terminal 4 can use the coordinate relationship V. The calibration method is not limited to the method in FIG. 6A. Several steps of the steps from step S131 to step S136 may be performed at the same time, or the number of movements and imaging times may be different from those in FIG. 6A. Further, the form of the relative movements of the camera C and the markers MK in the calibration processing are not limited to the form in FIG. 6B.

In the above described embodiment, the coordinate relationship V between the reference coordinate system and the robot coordinate system is specified in advance and the arm A is controlled to have anisotropy in the reference coordinate system based on the coordinate relationship V, and thereby, anisotropy may be provided to the action of the robot in a direction in accordance with the real space in which the markers MK exist. In the embodiment, the operator may perform the teaching work in a state in which anisotropy is accurately provided in the vertical direction and the horizontal direction with respect to the worktable WT on which the markers MK exist. That is, anisotropy is provided in a direction shifted from the vertical direction and the horizontal direction with respect to the worktable WT, and thereby, the operator may be prevented from having a feeling of strangeness.

(2) Other Embodiments

In the above described embodiment, the camera C as the imaging part is provided in the imaging unit 2 attached to the robot 1, however, the camera C may be a component part of the robot 1. In this case, the position relationship between the TCP and the position of the camera C may be prepared as known information. Further, the imaging part may be only adapted so that the position relationship with the markers MK is changeable, and not necessarily moved by the arm A. For example, the imaging part may be fixed so that the worktable WT can be imaged or the arm A may move the markers MK on the worktable WT. The calibration unit 34 may specify the correspondence relationship between the position of the TCP in the robot coordinate system when the arm A moves the markers MK and the position of the TCP in the reference coordinate system based on the calibration images captured by the imaging part as the coordinate relationship V.

Figure 7:
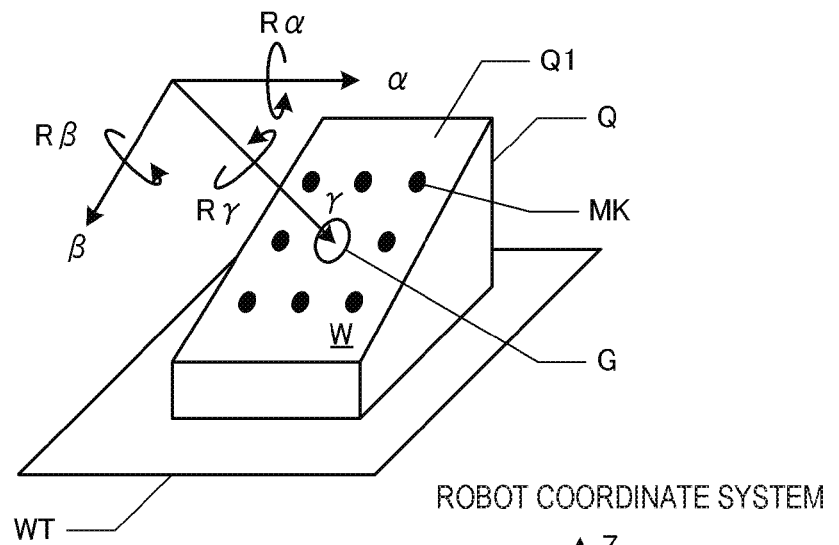
FIG. 7 is a schematic diagram of a reference coordinate system according to another embodiment.
Figure 7:
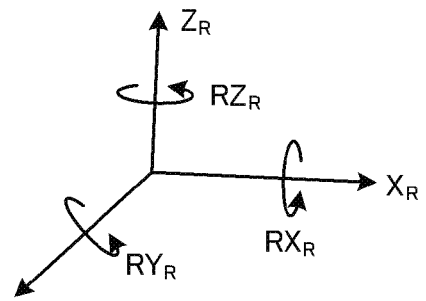

FIG. 7 is a schematic diagram of a reference coordinate system according to another embodiment. In the embodiment, a fitted member Q is placed on the worktable WT, and a fitting hole G is formed nearly at the center of a fitting surface Q1 of the fitted member Q. The fitting hole G is a cylindrical hole vertical to the fitting surface Q1. A plurality of markers MK are provided around the fitting hole G (within a predetermined distance) in the fitting surface Q1. The predetermined distance may be set based on e.g. the optical specifications of the camera C, or the predetermined distance may be set to be smaller as the distortion of the camera C is larger.

The reference coordinate system is an orthogonal coordinate system defined by an $\alpha$ direction as a direction in which the markers MK are horizontally arranged on the fitting surface Q1, a $\beta$ direction as a direction on the fitting surface Q1 orthogonal to the axis of the $\alpha$ direction, and a $\gamma$ direction orthogonal to the fitting surface Q1. On the other hand, the robot coordinate system is the same as that of the first embodiment. In the first embodiment, the orthogonal coordinate system and the robot coordinate system are similar coordinate systems, however, the orthogonal coordinate system and the robot coordinate system are not necessarily similar. In the reference coordinate system, the same calibration processing as that of the first embodiment is performed, and thereby, the coordinate relationship V as the correspondence relationship between the orthogonal coordinate system and the robot coordinate system may be specified. Further, the plurality of markers MK are provided around the fitting hole G (within the predetermined distance), and thereby, the coordinate relationship V that enables accurate coordinate transform between the orthogonal coordinate system and the robot coordinate system around the fitting hole G can be specified.

In the embodiment, when an object is fitted in the fitting hole G, the control terminal 4 provides anisotropy in the fitting direction ($\gamma$ direction) and the other directions than the fitting direction ($\alpha$ direction, $\beta$ direction) in the reference coordinate system in the control of the arm A. In the equation (1) of impedance control, the control terminal 4 sets the elastic coefficient k in the $\gamma$ direction as the first direction to be larger than the elastic coefficients k in the $\alpha$ direction and the $\beta$ direction as the second directions. Further, the end effector that grasps the work as an object is attached to the robot 1, and the position of the TCP in which the work grasped by the end effector is to be fitted in the fitting hole G is set as the target position $S_t$. The target position $S_t$ is set by the above described teaching work.

As described above, when the force control is performed with anisotropy provided so that the position of the TCP may be closer to the target position $S_t$, the work easily moves according to the wall surface of the fitting hole G in the $\alpha$ direction and the $\beta$ direction, and the work may reliably be fitted to the deepest part of the fitting hole G in the $\gamma$ direction. The equation (1) of impedance control may be used with respect to each axis direction defining the reference coordinate system, and thus, the control terminal 4 may easily realize anisotropy in the reference coordinate system.

Figure 8:
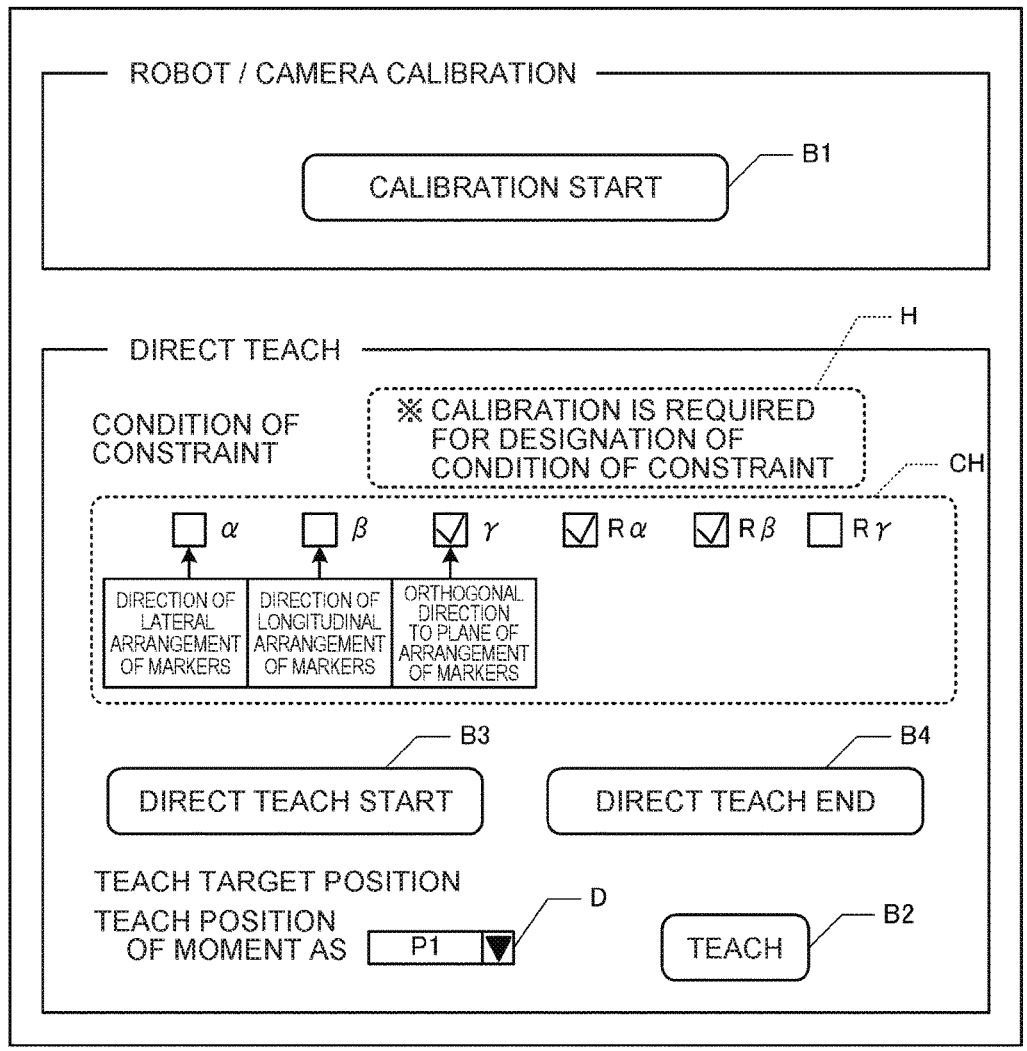
FIG. 8 shows a GUI according to the other embodiment.

FIG. 8 shows a GUI according to the embodiment. Also, in the embodiment, the same teaching processing as that of the embodiments is performed. Note that descriptions of informing the operator of directions in which anisotropy is provided in the reference coordinate system with reference to the positions of the markers MK is added in checkboxes CH of the GUI. In the embodiment, the reference coordinate system is set with reference to the direction of the fitting surface Q1, and the operator is harder to recognize the $\alpha$ direction, the $\beta$ direction, and the $\gamma$ direction in the real space. However, the $\alpha$ direction, the $\beta$ direction, and the $\gamma$ direction are informed with reference to the positions of the markers MK, and thus, anisotropy that can be realized may be easily recognized based on the positions of the markers MK recognized within the real space.

The invention may be applied to another vertical articulated robot than that with six axes or applied to a scalar robot in which all rotation shafts of arms are parallel. Further, the force sensor FS is not necessarily provided on the distal end of the arm A, and the force detector is not necessarily the force sensor FS. For example, as the force detector, torque sensors that detect torque acting on the joints J1 to J6 may be provided for the respective joints J1 to J6. Or, the torque may be detected based on load on the motors M1 to M6 in place of the torque sensors. Furthermore, at least one of the robot coordinate system and the reference coordinate system may be another coordinate system than the orthogonal coordinate system. For example, the reference coordinate system may be a cylindrical coordinate system. In addition, the control terminal 4 does not necessarily execute the processing for control of the arm A and the processing of the control terminal 4 may be realized by the teaching terminal 3.

The entire disclosure of Japanese Patent Application No. 2015-068268, filed Mar. 30, 2015 is expressly incorporated by reference herein.

What is claimed is:

1. A robot comprising:
   a force sensor; and
   a motor that changes a position relationship between a marker and a camera,
   wherein the motor is controlled to have anisotropy based on a coordinate relationship and a detection value of the force sensor, the coordinate relationship being a correspondence relationship between a reference coordinate system with reference to a position of the marker and a robot coordinate system as reference of control of the motor based on images of the marker captured by the camera in a plurality of the position relationships.

2. The robot according to claim 1, further comprising the camera.

3. The robot according to claim 1, wherein, the motor is controlled so that ease of movement of a moving point movable by the motor may be larger in a second direction in the reference coordinate system than that in a first direction in the reference coordinate system.

4. The robot according to claim 1, wherein the motor is controlled so that mechanical impedance realized by the motor may be larger in a second direction in the reference coordinate system than that in a first direction in the reference coordinate system.

5. The robot according to claim 3, wherein the second directions are two directions on a single plane in the reference coordinate system, and the first direction is a direction orthogonal to the single plane in the reference coordinate system.

6. The robot according to claim 3, wherein the second direction is a direction along a single axis in the reference coordinate system, and the first directions are two directions on a plane orthogonal to the single axis in the reference coordinate system.

7. The robot according to claim 3, wherein at least one of the first direction and the second direction is a rotation direction about an axis in a predetermined direction in the reference coordinate system.

8. The robot according to claim 1, wherein, in a teaching work in which an operator moves a robot and teaches an action of the robot, the motor is controlled to have anisotropy.

9. The robot according to claim 1, wherein, when an object is fitted in a fitting hole, the motor is controlled to have anisotropy in a fitting direction in the reference coordinate system and another direction than the fitting direction.

10. The robot according to claim 9, wherein the markers are provided in a plurality of positions within a predetermined distance from the fitting hole.

11. A robot control apparatus that controls a robot including a force sensor, and a motor that changes a position relationship between a marker and a camera, comprising:
    a calibration unit that, during calibration, specifies a coordinate relationship as a correspondence relationship between a reference coordinate system with reference to a position of the marker and a robot coordinate system as reference of control of the motor based on images of the marker captured by the camera in a plurality of the position relationships; and
    a control unit that controls the motor to have anisotropy based on the coordinate relationship and a detection value of the force sensor.

12. The robot control apparatus according to claim 11, wherein the robot includes a user interface that, in a teaching work in which an operator moves a robot and teaches an action of the robot, controls the motor to have anisotropy, receives designation as to whether or not to control the motor to have anisotropy in the teaching work, and, during calibration, permits designation of control of the motor to have anisotropy in the teaching work.

13. The robot control apparatus according to claim 12, wherein the user interface informs the operator of a calibration requirement for control of the motor to have anisotropy in the teaching work.

14. The robot control apparatus according to claim 12, wherein the user interface informs the operator of a direction in which anisotropy is provided with reference to the position of the marker.

15. A robot system comprising:
    a robot including a force sensor and a motor;
    a camera having a position relationship with a marker when driven by the motor;
    a calibration unit that, during calibration, specifies a coordinate relationship as a correspondence relationship between a reference coordinate system with reference to a position of the marker and a robot coordinate system as reference of control of the motor based on images of the marker captured by the camera in a plurality of the position relationships; and
    a control unit that controls the motor to have anisotropy based on the coordinate relationship and a detection value of the force sensor.

* * * * *